(12) United States Patent
Frigerio et al.

(10) Patent No.: US 8,720,231 B2
(45) Date of Patent: May 13, 2014

(54) METHOD AND APPARATUS FOR OPTICAL FIBER COLORING

(75) Inventors: Silvio Frigerio, Milan (IT); Lidia Terruzzi, Milan (IT); Giovanni Villani, Milan (IT); Corrado Castoldi, Brugherio (IT)

(73) Assignee: Prysmian S.p.A., Milan (IT)

( * ) Notice: Subject to any disclaimer, the term of this patent is extended or adjusted under 35 U.S.C. 154(b) by 465 days.

(21) Appl. No.: 12/452,754

(22) PCT Filed: Aug. 1, 2007

(86) PCT No.: PCT/EP2007/057970
§ 371 (c)(1),
(2), (4) Date: Apr. 2, 2010

(87) PCT Pub. No.: WO2009/015695
PCT Pub. Date: Feb. 5, 2009

(65) Prior Publication Data
US 2010/0196595 A1 Aug. 5, 2010

(51) Int. Cl.
*C03C 25/18* (2006.01)
(52) U.S. Cl.
USPC .......................... 65/430; 427/163.2; 118/125
(58) Field of Classification Search
USPC .......................... 65/430; 427/163.2; 118/125
See application file for complete search history.

(56) References Cited

U.S. PATENT DOCUMENTS

| | | | | |
|---|---|---|---|---|
| 4,531,959 | A * | 7/1985 | Kar et al. | 65/382 |
| 4,622,242 | A | 11/1986 | Mackay | |
| 4,867,775 | A * | 9/1989 | Cain et al. | 65/382 |
| 6,044,665 | A * | 4/2000 | Lysson et al. | 65/430 |
| 2004/0120671 | A1* | 6/2004 | Hong et al. | 427/163.2 |
| 2006/0062907 | A1 | 3/2006 | Bertz et al. | |

FOREIGN PATENT DOCUMENTS

| | | |
|---|---|---|
| EP | 0 354 289 | 2/1990 |
| EP | 1 640 347 A2 | 3/2006 |
| GB | 2 160 448 A | 12/1985 |
| WO | WO 01/60757 A2 | 8/2001 |
| WO | WO 02/06175 A1 | 1/2002 |
| WO | WO 03/091781 A1 | 11/2003 |

OTHER PUBLICATIONS

International Search Report from the European Patent Office for International Application No. PCT/EP2007/057970, mailed Apr. 10, 2008.

* cited by examiner

*Primary Examiner* — Queenie Dehghan
(74) *Attorney, Agent, or Firm* — Finnegan, Henderson, Farabow, Garrett & Dunner, L.L.P.

(57) ABSTRACT

An apparatus for coloring optical fibers, includes: a first reservoir for containing a natural coating material to be applied onto an optical fiber being drawn; a second reservoir for containing a colorant to be mixed with the natural coating material; a mixer in fluid communication with the first and second reservoirs to receive a first flow of natural coating material and a second flow of colorant and to mix the first and second flows to obtain a colored coating material; a coating die in fluid communication with the mixer to receive the flow of colored coating material and to apply it onto the optical fiber being drawn. A first gas pressure source is associated with the first reservoir, exerting on the natural coating material a first gas pressure variable as a function of at least one optical fiber drawing parameter, and a second gas pressure source is associated with the second reservoir, exerting on the colorant a second gas pressure variable as a function of at least one optical fiber drawing parameter. The first and second lines have relevant pressure drop in a ratio corresponding to the ratio of natural coating material and colorant providing the colored coating material.

13 Claims, 1 Drawing Sheet

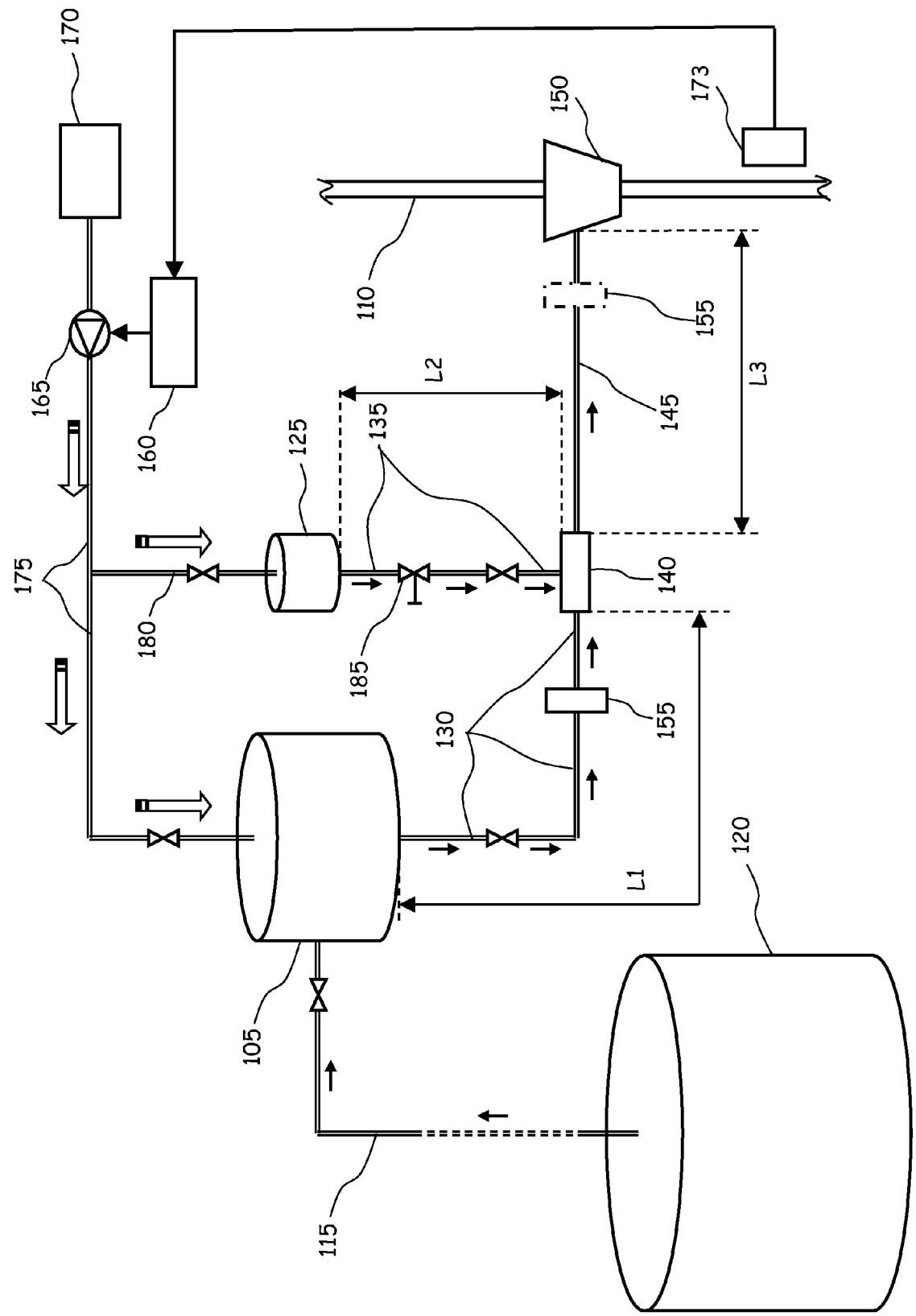

METHOD AND APPARATUS FOR OPTICAL FIBER COLORING

CROSS REFERENCE TO RELATED APPLICATION

This application is a national phase application based on PCT/EP2007/057970, filed Aug. 1, 2007, the content of which is incorporated herein by reference.

BACKGROUND OF THE INVENTION

1. Field of the Invention

The present invention generally relates to the manufacturing of optical fibers. More specifically, the present invention relates to a method and a system for coloring optical fibers.

2. Description of the Related Art

An optical fiber generally comprises a core surrounded by a cladding (hereinafter both collectively referred to as "optical waveguide"), said core and cladding being preferably made of glass, and at least one exterior coating.

In some instance the exterior coating is one (single coating), in others the exterior coatings are two (double coating). In the latter case, the exterior coating directly contacting the optical waveguide is called "first coating" or "primary coating" and the exterior coating overlying the first one is called "second coating" or "secondary coating". Typically, said first and second coatings are made of polymer material.

In telecommunications applications, many optical fibers are often bundled together, for example in multiple individual optical fiber strands that are packaged to form a ribbon or a cable. It is important, for the operators dealing with the installation and maintenance, to be able to distinguish the individual optical fibers in the ribbon or cable.

To aid identification and distinction of the optical fibers when many of them are packaged together, color coding of the optical fibers is adopted.

The coloring of the optical fibers is made during the fiber manufacturing, after one or more coating layers are applied to the drawn fiber. For example, one of the fiber coatings, e.g. the secondary coating can be colored.

A pre-colored coating material is applied onto the optical fiber, such pre-colored material being prepared by mixing a non-colored coating material with a colorant, typically a polymeric composition comprising a pigment before the application onto the fiber.

For example, in EP 1640347 an apparatus and method for color-coating an optical fiber are described, wherein mixing of the color concentrate with secondary coating is performed directly in the coating die. One or more color reservoirs are provided. The reservoirs are connected via relevant feed lines, to the coating die, which also receives, from a coating feed line, the secondary coating; a flow controller, like a positive-displacement pump, a reciprocating pump, a metering pump, a mass-flow controller, controls the flow of the delivered color concentrate. The speed of the flow controller is controlled or adjusted to be proportionate to the draw speed.

EP 354 289 discloses a method and an apparatus for the on-line, "on-the-draw" application onto an optical fiber of a two-package coating system. A first and a second liquid components, e.g. two liquid resins, a resin and a curing catalyst therefor, a resin and a modifier therefor such as a dye, are continuously mixed under controlled conditions and thereafter directly supplied to a liquid coater as a homogeneous liquid blend. The two liquid components are drawn from respective reservoirs through respective supply lines and precision positive displacement metering pumps, and are fed to a static mixer, which mixes the two liquid components to form a mixture continuously supplied to a coater. The rate of mixing and supply of the reactive liquid mixture to the coater is controlled by feedback from a pressure transducer attached to the coater. As the mixture is depleted by application to the fiber, the pressure drop in coater is sensed by the transducer and a feedback signal is transmitted to a programmable electronic flow controller.

WO 01/60757 describes a method for producing optical fibers. A coating composition is introduced into a liquid conduit via an inlet line. The colorant, either alone or in a suitable carrier, is introduced into the liquid conduit via a line. After introduction, the rate of flow of the coating composition through the liquid conduit and into a mixing zone is metered by a control system comprising a flow meter, a flow indicator controller and a valve controllable by the flow indicator controller. A second control system is provided to meter the colorant into the mixing zone. The colorant control system includes a colorant flow meter, a colorant flow indicator controller and a valve controllable by the colorant flow indicator controller. Based upon the flow rate of the coating composition provided by the flow meter, the ratio controller sends a signal to the appropriate colorant flow indicator controllers to affect the addition of specific colors, at certain flow rates. The colorants can be added to the coating composition at any point upstream of the mixing zone outlet. The mixing zone can be any environment capable of mixing the stock coating composition and colorants (static mixer being preferred). The mixing tank is provided with an inlet for admitting coating composition and an inlet for admitting colorant. The inlet(s) may be located at any position(s) upstream of the mixing zone. After the colorants are added and thoroughly mixed in the tank, a finished coating composition is provided. The finished coating composition exits the mixing tank, and is pumped through the liquid conduit to the device that applies the coating composition onto the optical fibers, commonly referred to as a draw tower. Between the tank and the draw tower, several components are optionally provided.

SUMMARY OF THE INVENTION

The Applicant has observed that in the production of a colored optical fiber by mixing "on-line" natural coating material with a colorant, wherein the mixing is performed during the optical fiber drawing, the double flow regulation of the colorant and of the natural coating to obtain the correct colored coating is cumbersome.

In particular, the flows and ratio of the colorant and of the natural coating should be regulated for achieving the fiber coloring with the desired parameters that should be kept substantially constant all along the drawn fiber against fluctuations of the fiber drawing parameters.

The Applicant found that an optical fiber showing the sought color characteristics in an uniform way can be produced by adjusting the flows of the natural coating and of the colorant based on the fiber drawing parameters like, for example, the fiber drawing speed, the preform drawing temperature, the diameter of the coated fiber. The adjustment of the flows can be performed by applying a pressure on the coating and color reservoirs. The ratio of the colorant and of the natural coating is predetermined in view of the sought characteristics. This ratio can be changed with no need of complex operations. The resulting apparatus and method for continuously coloring an optical fiber during the drawing process is rather simple, flexible to production change and minimizes the purging procedures in term of manufacturing standstill and waste of material.

According to an aspect of the present invention, an apparatus for coloring optical fibers is provided, comprising:
- a first reservoir for containing a natural coating material to be applied onto an optical fiber being drawn;
- a second reservoir for containing a colorant to be mixed to the natural coating material;
- a first line comprising the first reservoir and a natural coating material delivery line;
- a second line comprising the second reservoir and a colorant delivery line;
- a mixer in fluid communication with the first and second reservoirs via said first and second lines, so as to receive a first flow of natural coating material and a second flow of colorant and to mix the first and second flows to obtain a colored coating material;
- a coating die in fluid communication with the mixer to receive the flow of colored coating material and to apply it onto the optical fiber being drawn, wherein:
- a first gas pressure source is provided, associated with the first reservoir, exerting on the natural coating material a first gas pressure variable as a function of an optical fiber drawing speed;
- a second gas pressure source is provided, associated with the second reservoir, exerting on the colorant a second gas pressure variable as a function of an optical fiber drawing speed; and
- said first and second line having relevant pressure drop in a ratio corresponding to the ratio of natural coating material and colorant providing the colored coating material.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the following of the description as "natural coating material" it is meant a polymeric composition for single coating layer or for primary or, preferably, secondary coating, in the case of a double coating system, said polymeric composition being substantially free from components capable of imparting color to the coating.

For the purposes of the present invention, as "colorant" it is meant a dispersion of a pigment or a solution of a dye in a carrier vehicle adapted to be mixed with the material used to form an optical fiber coating so as to obtain a colored coating of the desired color.

By "flow coefficient" (hereinafter abbreviated as "$C_v$") it is expressed the flow capacity in m³ per hour of water at 15.5° C. (60° F.) with a pressure drop of 1 kPa, according to the following equation:

$$C_v = 11.7 \times Q \sqrt{\frac{G}{\Delta P}}$$

wherein Q is the water flow (m³/hour), G is the specific gravity of a fluid relative to water, and $\Delta P$ is the pressure drop (kPa) across the valve when wide open.

As "needle valve" it is meant a multi-turn valve including a needle-shaped closing element. Needle valves have a design resembling that of a globe valve, and are typically available in smaller sizes. Needle valves are often used on secondary systems for fine control and shut off, e.g. with analyzers.

As "mixer" it is intended a device capable, in operation, of mixing two fluids, particularly a coating material and a colorant. By "static mixer" there is meant a device wherein static mixing elements, for example a series of baffles, are contained in a cylindrical (tube) or squared housing. As streams flow through the mixer, the "non-moving" elements continuously blend the materials.

Advantageously, the apparatus of the invention comprises a pressure-drop element positioned between the second reservoir and the mixer. A pressure drop element useful for the present invention can be a constriction in the pipeline diameter, a diaphragm, a valve. Preferably, the pressure-drop element comprises a valve, such as a needle valve or a metering valve.

Advantageously, the pressure drop element has a flow coefficient ($C_v$) of from 0.1 to 2.0. Though preferred, the provided flow coefficient values can be changed in view of specific system layout requirements.

Advantageously, the mixer is a static mixer.

Advantageously, the apparatus of the invention comprises at least one filter positioned downstream at least one of the first and second reservoirs. Preferably the at least one filter is provided between the mixer and the coating die.

In a preferred embodiment of the invention, the first and second gas pressure sources are the selfsame gas pressure source. A single pressure source operates both on the first and on the second reservoir at the same time.

Preferably, the pressure sources of the invention comprise at least one partializing valve. A pressure controller responsive to a detected fiber drawing speed and controlling the partializing valve according to the detected fiber drawing speed is advantageously provided.

Optionally, the first reservoir can be put in communication with a natural coating material storage tank, when refill is needed. Advantageously the refilling step is carried out during drawing stopover.

According to another aspect of the present invention, a method of coloring optical fibers during the optical fiber drawing is provided, comprising the steps of:
- feeding a natural fiber coating material and a colorant to a mixer;
- mixing the natural fiber coating material and the colorant in the mixer to obtain a colored coating material;
- supplying the colored coating material to a coating die wherein the feeding step comprises:
- exerting on the natural fiber coating a first gas pressure variable with at least one fiber drawing parameter; and
- exerting on the colorant a second gas pressure variable with at least one fiber drawing parameter.

In an embodiment of the invention, before the mixing step, a pressure drop is caused on the colorant feeding.

Said first and second gas pressures have preferably the same value and are varied jointly in operational relationship with at least one of the fiber drawing parameters.

The at least one fiber drawing parameter may be selected from coated fiber diameter, fiber drawing speed, fiber drawing temperature, or a combination thereof.

BRIEF DESCRIPTION OF THE DRAWING

FIG. 1 is a schematic diagram of an apparatus for coloring optical fibers according to an embodiment of the present invention.

DETAILED DESCRIPTION OF AN EMBODIMENT OF THE INVENTION

Referring to the drawing, in FIG. 1 a schematic diagram of an apparatus for coloring optical fibers while drawing according to an embodiment of the present invention is depicted.

The apparatus comprises a first reservoir 105, intended to contain the natural coating material used for forming a coating layer onto an optical fiber 110 being drawn in a drawing tower, particularly a material used for forming a secondary coating layer. Materials suitable to form optical fiber coatings, particularly secondary coatings, are, for example, those described in EP-A1-1497686. An exemplary commercial material is 3471-2-136, marketed by DSM.

The first reservoir 105 may have a capacity of the order of few tens of liters, for example, 25-30 l. The first reservoir 105 is supplied with coating material through a supply line 115, which starts at a natural coating material storage tank 120, relatively large (having for example a capacity of the order of 1000 l) and positioned remotely from the drawing tower. The supply of natural coating material from the tank 120 to the first reservoir 105 is preferably performed when the drawing process stops, in particular to avoid disturbance to the coating application during drawing.

The apparatus comprises a second reservoir 125 intended to contain a colorant suitable for being mixed with the natural coating material so as to give thereto a desired color, adapted to allow the identification of the optical fiber. For example, the colorant may provide, once mixed with the natural coating material in a suitable proportion, one of the 12 colors accepted by the standards to distinguish optical fibers in fiber optic cables.

The colorant reservoir 125, may be of smaller capacity than the coating material reservoir 105. For example it may be a bottle containing a quantity of the order of 1 Kg of colorant.

The colorant may be for example a blend of polyuretane-acrylates and high-concentration pigments described, for example, in WO 02/06175.

A natural coating material delivery line 130 departs from an outlet of the first reservoir 105, and a colorant delivery line 135 departs from an outlet of the second reservoir 125.

The natural coating material delivery line 130 and the colorant delivery line 135 end at a mixer 140, for example a static mixer (e.g., model H, ND 15, marketed by Pittaluga, Italy). The mixer 140 blends the natural coating material with the colorant, so as to obtain a colored coating material.

The delivery line 130 has a length L1 of, for example, from 1 to 5 meters.

The second reservoir 125 is located as near as possible to the mixer 140 so as the colorant delivery line 135 is short thus minimizing the extent of apparatus to be purged in case of change of colorant. A length L2 of the colorant delivery line 135 is of few centimeters, for example, from 5 cm to 50 cm.

A colored coating material delivery line 145 connects an outlet of the mixer 140 to an inlet of a coating die 150, which is arranged along the drawing tower. The coating die 150 receives the colored coating material from the mixer 140 and applies it onto the optical fiber being drawn the colored coating material, so as to obtain an optical fiber having a colored coating, e.g. a secondary coating, of the desired color.

The ratio between colored coating material and natural coating material is, preferably, of from 1:80 to 1:100.

The mixer 140 may be located close to the coating die 150. The colored coating material delivery line 145 has a length L3 of some centimeters, for example, from 10 cm to 50 cm.

Optionally, one or more filters, like the shown filter 155, may be arranged downstream the first reservoir 105, on the natural coating material delivery line 130, and/or the second reservoir 125, and/or on the colored coating material delivery line 145 The filter(s) are useful for eliminating impurities and/or particles of coating prematurely cross-linked and/or pigment aggregates.

In order to obtain an optical fiber coated with a coating layer having a thickness that is essentially constant notwithstanding changes in the optical fiber drawing speed, the flow rate of the natural coating material from the first reservoir 105 to the coating die 150 can be adjusted based on a measure of the fiber diameter, which depends on the fiber drawing speed and temperature.

To this purpose, in an embodiment of the present invention, a variable pressure is applied to the natural coating material contained in the first reservoir 105. In particular, a pressure controller 160 is inserted in a feedback control loop, controls a partializing valve 165 connected to an outlet of a compressed gas reservoir 170, containing a compressed gas such as an inert gas, e.g., nitrogen, and, based on a measure of the fiber diameter performed by a diameter measuring device 173 placed downstream the coating die 150, varies the amount of compressed gas that, through a pressurized gas delivery line 175 departing from an outlet of the valve 165, is fed to the first reservoir 105.

In order to keep the coloring of the coating layer essentially constant notwithstanding change in the optical fiber drawing speed, the flow rate of the colorant from the second reservoir 125 to the mixer 140 is adjusted based on the measure of the fiber diameter, and thus based on the fiber drawing speed and temperature, so that the correct proportion of natural coating material and colorant is preserved.

To this purpose, in an embodiment of the present invention, a variable pressure is also applied to the colorant contained in the second reservoir 125.

In particular, in an embodiment of the present invention, the variable pressure is obtained by coupling the second reservoir 125 to the outlet of the partializing valve 165, through a pressurized gas delivery line 180. In this way, the pressure value in the first and second reservoirs 105, 125 is substantially the same. This layout improves and/or makes it easy to adjust the flow rate of the natural coating material and of the colorant based on the fiber drawing speed.

In an embodiment of the present invention, the correct ratio of natural coating material and colorant is achieved by a pressure drop set along the colorant delivery line 135, which is aimed at differentiating the flow rates of the natural coating material and of the colorant. The pressure drop is for example attained inserting one or more valves, like the valve 185 shown in the drawing, along the colorant delivery line 135.

Advantageously, the valve 185 has a flow coefficient (i.e., a $C_v$) such as to cause a pressure drop corresponding to a ratio between the flow rate in the colorant delivery line 135 and the flow rate in the natural coating material delivery line 130 resulting in a predetermined color pattern of the optical fiber. For example, a valve 185 having a $C_v$ ranging from approximately 0.1 to approximately 2.0 may be used. The selection of the $C_v$ of the pressure drop element is made as a function of the drawing speed and of the pressure exerted on the reservoirs (and of the piping parameters of the plant).

In a preferred embodiment of the invention, the valve 185 has an adjustable flow rate. The flow rate can be varied, before starting the drawing process, depending on the desired color pattern, taking account of the fiber drawing speed.

Alternatively, the pressure drop can be provided by a component having a fixed pressure drop associated with the second reservoir 125. Such a component is set to provide the pressure drop suitable to generate the colorant flow rate yielding the colorant/natural coating ratio imparting the optical fiber with the sought color characteristics. At the change of the colorant and consequently of the colorant reservoir, such component can be changed and replaced with another one, having the pressure drop adapted to the new colorant, thus avoiding the cleaning of the pressure drop element. Different fixed pressure drop components, possibly disposable, may be provided for each colorant and/or for different process conditions.

The Applicant has conducted experimental trials, changing the type of valve 185 used for introducing the pressure drop along the colorant delivery line 135. In particular, the trials have been aimed at demonstrating the feasibility of the mixing, and the possibility of properly dosing the colorant flow so as to obtain a colored coating according to the requirements.

As a first trial, a drawing speed of 10 m/s was set; for the valve 185, a metering valve series 22 produced by Swagelok ($C_v$=0.007) was used. The Applicant observed that the pressure drop introduced by the valve excessively eased the flow of natural coating material compared to the colorant, so that the resulting optical fiber was not properly colored.

As second and third trials, a needle valve was used for the valve 185, particularly a valve, model PAT, size 4, produced by Parker, having a $C_v$ of from 0.4 to 0.45. Using this valve, the Applicant was able to verify that it is possible to adjust the colorant flow rate, and that such a flow rate varies with the fiber drawing speed. The change in the drawing speed from 10 m/s to 15 m/s and then to 20 m/s, keeping constant the valve opening, evidenced the difference in the color of the fiber, thereby confirming the variation in the pigment concentration; indeed, when the drawing speed increases, the flow of coating material has to increase to keep the coating thickness constant; to achieve this, the pressure in the first and second reservoir 105, 125 is increased, thus the colorant flow increases, so that the amount of pigments in the fiber increases.

In the third trial the degree of opening of the valve 185 was varied. It was observed that, by progressively closing the valve (i.e., progressively reducing the colorant flow), the coloring of the optical fiber progressively diminished.

The results of the fourth trial are reported in the table below.

| Valve closure (%) | L | C | h |
|---|---|---|---|
| 100 | 91.13 | 15.40 | 146.80 |
| 80 | 84.04 | 24.76 | 158.80 |
| 60 | 80.83 | 29.63 | 163.17 |
| 40 | 71.15 | 45.21 | 166.17 |
| 20 | 70.54 | 44.97 | 165.97 |
| 0 | 71.59 | 44.35 | 166.00 |
| desired color ratings | 45-85 | 35-70 | 120-180 |

The factor L (for "Lightness") indicates the lightness of the sample; the factor C (for "Chrome") indicates the sample chrominance (it is the dominant factor); the factor H (for "Hue") denotes the hue of the sample, i.e. the color density. The measured results have been compared to the desired color ratings. The drawing speed has been kept constant at 20 m/s, the only change being the degree of closure of the valve 185. It can be appreciated that in some cases all the three factors L, C and H are within the sought ratings. It is worth pointing out that an increase, e.g. to 25 m/s, of the drawing speed will likely cause the factor C for the 60% and 80% closure conditions to be within the ratings.

Thanks to the present invention, a high flexibility is achieved, because in order to produce optical fibers having a different color it is sufficient to replace the colorant reservoir 125, which, as described in the foregoing, may advantageously be in the form of a relatively small bottle containing approximately 1 Kg of colorant.

Also, the concentration of the pigments in the colorant, and the relatively small size of the colorant reservoir 125, simplifies the stirring of the colorant for preventing deposit of colorant on the reservoir bottom.

Negligible amounts of natural coating material are wasted when the colorant has to be changed, because the natural coating material is not pre-mixed with the colorant, rather it is mixed during the fiber drawing. Also the waste of colorant may be very limited, thanks to the fact that the size of the colorant reservoir may be small and the delivery line limited in length. The operations for purging and cleaning the lines when the colorant has to be changed are also made simpler, thanks to the reduced volume of the mixing system and the proximity thereof to the coating die; the purging might for example be performed during the ramp-up and ramp-down phases of the fiber drawing process (i.e., respectively, the initial transient phase during which the drawing speed increases till it reaches the target drawing speed, and the final transient phase, when the preform material is ending, during which the fiber drawing speed is decreased). It could also be possible to devote a reservoir to each colorant to be applied.

Furthermore, the storage and disposal of the colorant containers, as well as the stirring of the colored coating to homogenize the dispersion is simplified, thanks to the small sizes thereof.

The present invention has been here described making reference to exemplary embodiments thereof. Those skilled in the art will readily recognize that several modifications can be made to the described embodiments, for example in order to meet contingent needs, as well as other embodiments of the invention can be conceived, without departing from the scope of the invention defined in the appended claims.

For example, although in the exemplary embodiment described a same pressure value is applied to both the natural coating material reservoir and the colorant reservoir, applying differentiated pressure values to the two reservoirs. In this case, the provision of the pressure drop downstream the colorant reservoir might in some cases be dispensed for.

In an embodiment of the present invention the colorant delivery line 135 is made of tubes having a diameter smaller than the tubes of the natural coating delivery line 130. A smaller diameter helps to save time and cost during the washing of the colorant delivery line 135. The pressure drop generated by such a difference causes some pressure drop.

The invention claimed is:

1. An apparatus for coloring optical fibers, comprising:
    a first reservoir for containing a natural coating material capable of being applied to an optical fiber being drawn;
    a second reservoir for containing a colorant capable of being mixed with the natural coating material;
    a first line comprising a natural coating material delivery line connected to the first reservoir;
    a second line comprising a colorant delivery line connected to the second reservoir;
    a mixer in fluid communication with the first and second reservoirs via said first and second lines, capable of receiving a first flow of natural coating material from the first line and a second flow of colorant from the second line and mixing the first and second flows to obtain a colored coating material; and
    a coating die in fluid communication with the mixer capable of receiving a third flow of the colored coating material and applying said coating material to the optical fiber being drawn, wherein
a single gas pressure source is associated with the first and second reservoirs, exerting by a first controllable valve on the natural coating material a first variable gas pressure and on the colorant a second variable gas pressure, wherein the first controllable valve varies the first and second variable gas pressures as a function of at least one optical fiber drawing parameter determined by a parameter determining device; and
said first and second lines have a relevant pressure drop in a ratio corresponding to the ratio of natural coating material and colorant providing the colored coating material.

2. The apparatus of claim 1, comprising a pressure-drop element between the second reservoir and the mixer.

3. The apparatus of claim 2, wherein the pressure-drop element comprises a second valve.

4. The apparatus of claim 3, wherein said second valve is a needle valve.

5. The apparatus of claim 3, wherein said second valve is a metering valve.

6. The apparatus of claim 2, wherein the pressure-drop element has a flow coefficient of 0.1 to 2.0.

7. The apparatus of claim 1, wherein said mixer is a static mixer.

8. The apparatus of claim 1 comprising at least one filter downstream at least one of the first and second reservoirs.

9. The apparatus of claim 8, wherein the at least one filter is between the mixer and the coating die.

10. The apparatus of claim 1, wherein said first and second variable gas pressures are substantially equal.

11. The apparatus of claim 1, wherein said first controllable valve comprises a partializing valve.

12. The apparatus of claim 11, wherein said parameter determining device can determine at least one fiber drawing parameter selected from coated fiber diameter, fiber drawing speed, fiber drawing temperature, or a combination thereof.

13. The apparatus of claim 11, wherein said parameter determining device can determine at least one fiber drawing parameter selected from coated fiber diameter, fiber drawing temperature, combinations thereof, or combinations thereof with fiber drawing speed.

* * * * *